United States Patent [19]
Macchi

[11] 3,731,886
[45] May 8, 1973

[54] APPARATUS FOR SPIRALLY WINDING A SHEATHED CABLE AND DEVICES FOR RETAINING SUCH A CABLE IN A SPIRALLY WOUND CONFIGURATION

[76] Inventor: Romualdo Macchi, Via S. Paolo 31, Pisa, Italy

[22] Filed: Apr. 5, 1971

[21] Appl. No.: 130,964

[30] Foreign Application Priority Data

Apr. 11, 1970 Italy..................9449 A/70

[52] U.S. Cl.........................242/77.1, 242/129
[51] Int. Cl. ................................B65h 75/34
[58] Field of Search..................242/77.1, 83, 84, 242/110, 110.1, 110.3, 115, 82, 129, 86, 86.1; 137/355.19

[56] References Cited

UNITED STATES PATENTS

| | | | |
|---|---|---|---|
| 3,072,358 | 1/1963 | Knapp | 242/110 X |
| 2,835,181 | 5/1958 | Seeley | 242/77.1 X |
| 2,125,285 | 8/1938 | Droeger | 242/77.1 |
| 3,584,809 | 6/1971 | Ogden | 242/129 |

FOREIGN PATENTS OR APPLICATIONS

| | | | |
|---|---|---|---|
| 1,419,033 | 10/1965 | France | 242/110.3 |
| 457,218 | 3/1928 | Germany | 242/110.3 |

Primary Examiner—George F. Mautz
Assistant Examiner—Edward J. McCarthy
Attorney—John J. McGlew and Alfred E. Page

[57] ABSTRACT

A spirally wound sheathed cable is retained in its spirally wound configuration by means of clamping devices mounted at end portions of a frame extending diametrically across the cable. Further, independent, clamping devices angularly spaced from the frame are supported by the wound cable. The frame is adjustable in length to vary the diametral spacing between the clamping devices carried thereby.

7 Claims, 9 Drawing Figures

PATENTED MAY 8 1973
3,731,886
SHEET 1 OF 3

INVENTOR
ROMUALDO MACCHI
BY
McGlew + Tuttle
ATTORNEY

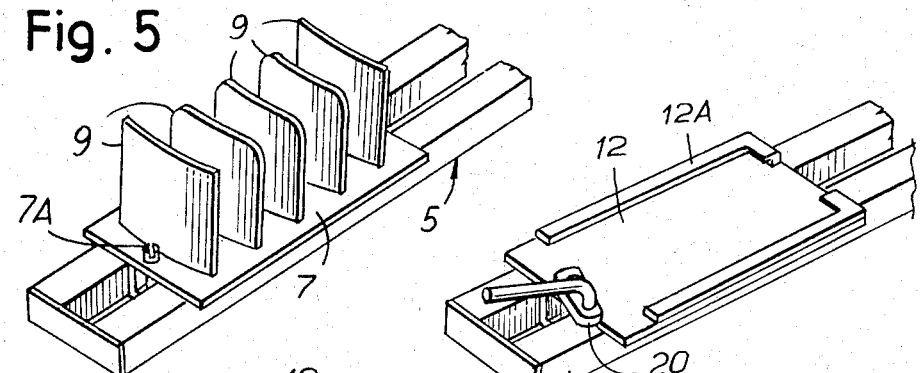
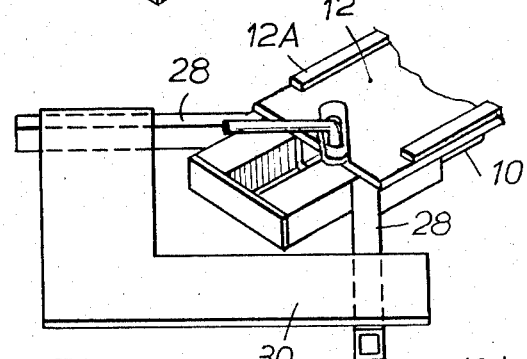
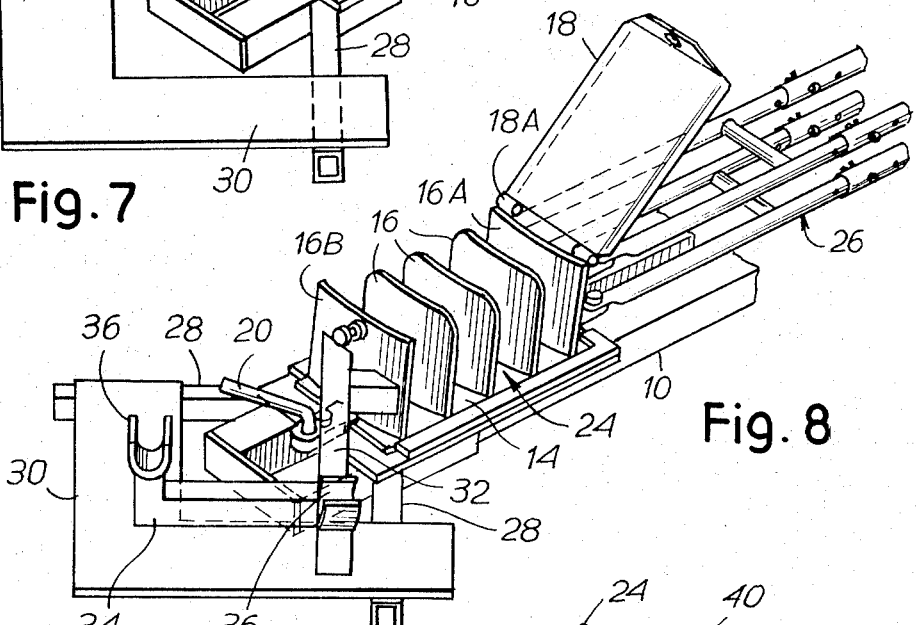
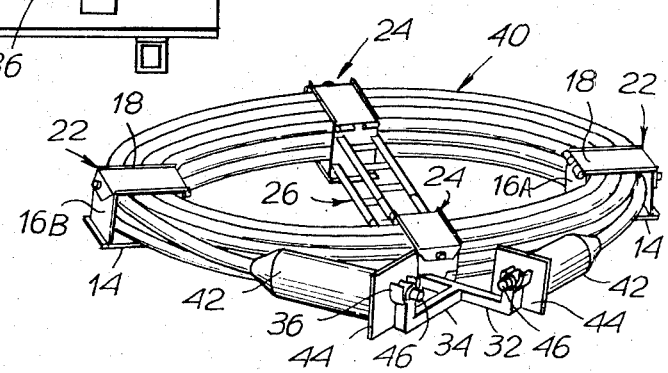

3,731,886

APPARATUS FOR SPIRALLY WINDING A SHEATHED CABLE AND DEVICES FOR RETAINING SUCH A CABLE IN A SPIRALLY WOUND CONFIGURATION

FIELD OF THE INVENTION

The present invention relates to apparatus for spirally winding a sheathed cable and to devices for retaining such a cable in a spirally wound configuration.

SUMMARY OF THE INVENTION

According to the invention, there is provided a device for retaining a cable in a spirally wound configuration comprising a frame extending substantially across a diameter of the wound cable and having two end portions, first clamping box means mounted on each end portion of the frame, each first clamping box means including means defining seats for the turns of the cable, and second clamping box means independent of the first clamping box means, the second box means including means defining further seats for the turns of the cable and the second clamping box means being angularly spaced from the first clamping box means.

Further according to the invention, there is provided apparatus for spirally winding a cable comprising a rotatable support unit including radially adjustable guides for the turns of the wound cable, a cable clamping unit removably supported by the support unit and comprising a radially extending frame having a plurality of end portions, and a cable clamping device mounted at each end portion of the frame, and at least one further cable clamping device removably mounted in a selected radial position on the support unit, the further cable clamping device being angularly spaced from said cable clamping unit.

BRIEF DESCRIPTION OF THE DRAWINGS

An embodiment of the invention will now be described, by way of example only, with reference to the accompanying diagrammatic drawings, in which:

FIGS. 5, 6, 7 and 8 are fragmentary perspective views, to an enlarged scale, of the apparatus shown in FIG. 1; and FIG. 9 is a perspective view of a spirally wound cable units retaining structure.

DESCRIPTION OF THE PREFERRED EMBODIMENT

Figure 1:
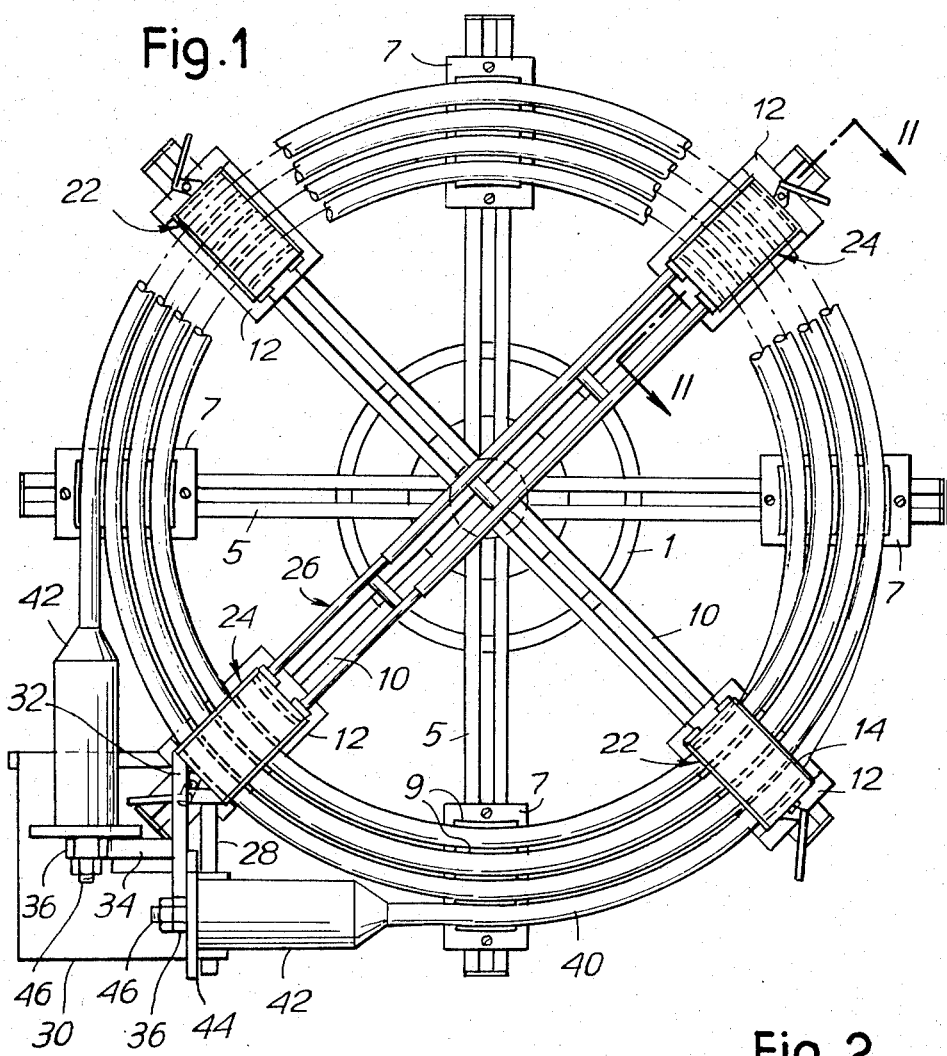
FIG. 1 is a plan of apparatus for spirally winding a cable.
Figure 2:
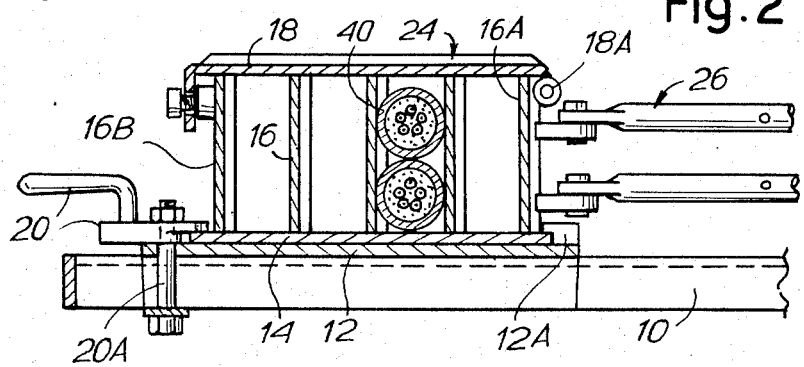
FIG. 2 is a section, to an enlarged scale, taken on line II—II of FIG. 1.
Figure 3:
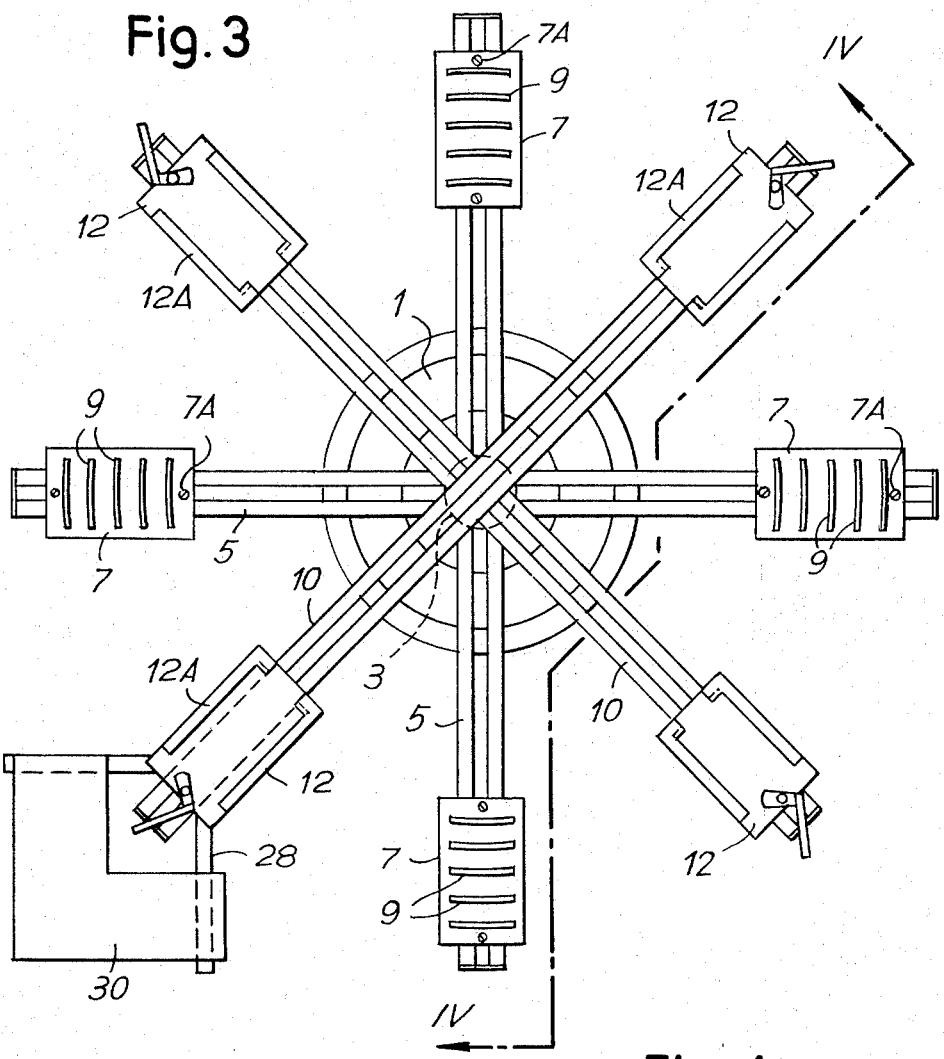
FIG. 3 is a view similar to FIG. 1 but showing the apparatus after the removal of a wound cable and its retaining structure.
Figure 4:
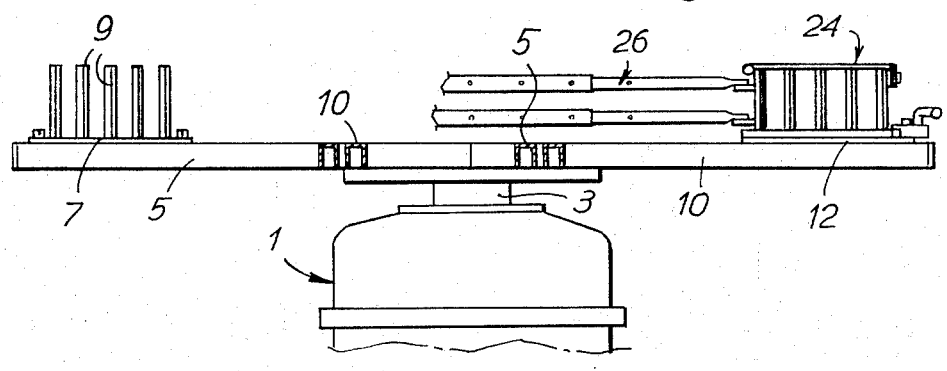
FIG. 4 is a view on line IV—IV of FIG. 3.

As shown in the accompanying drawings, apparatus for winding a cable into spiral configuration having turns lying in one or more planes comprises a spiral base 1 mounting a vertical central shaft 3 (FIG. 4) which carries a rotatable unit including diametral supporting arms of the cable winding and retaining means. In particular, the rotatable unit comprises a pair of arms 5 perpendicular to each other and forming radial guides for slide members 7 in the form of plates. The slide members 7 have vertical guides 9, some of which are at least approximately arcuate with a center of curvature lying on the axis of the shaft 3. The slide members 7 can be locked in a selected position along the arms 5, by suitable means, for example by screw means 7A, the slide members 7 being adjustable in this manner to suit the length of the multiple sheathed or stranded cable to be wound, as will be explained in greater detail hereinafter.

The rotatable unit includes another pair of perpendicular arms 10 angularly offset by 45° with respect to the arms 5. The two arms 10 form radial guides for slide members 12 also in the form of plates. The slide members 12 form seats for base plates 14 which carry upstanding guides 16, 16A, 16B similar to the guides 9, the base plates 14 being located on the slide members 12 by means of peripheral lips 12A on the slide members 12. A cover 18 is pivoted at 18A to the guide 16A and can be supported by the upper edges of the guides 16, 16B and fixed to the guide 16B to form a cable retaining box or clamp for retaining the cable in its spirally wound configuration. The boxes formed by the members 14, 16 and 18 can be releasably secured to the slide plates 12, for example by means of locking levers 20 mounted on pivots 20A. One box is mounted on a respective slide member 12 at each end portion of the arms 10, two of the boxes, generally indicated by 22, are independent of each other and are located on one of the arms 10 and the other two boxes, generally indicated by 24, are located on the other of the arms 10 and are connected by a frame 26, suitably a lattice frame. The frame 26 comprises telescopic frame members which enable the length of the frame 26 and thus the diametral distance between the boxes 24 to be adjusted.

Also the diametral distance between the boxes 22 is adjustable by means of the radially movable slide members 12. The slide members 12 for the boxes 24 are radially adjustable to correspond to the spacing of the boxes 24 on the frame 26. The frame 26 can be adjusted to a pre-set length according to the length of cable to be wound.

One of the slide members 12 carries a pair of inclined arms 28 which support a plate 30. The corresponding box 24 which is carried by the slide member 12 is provided with an arm 32 from which extends a further arm 34. The end portions of the arms 32, 34 form two saddles 36 for supporting anchoring heads at respective ends of the cable.

The boxes 22 and 24 are readily removable from their associated slide members 12 and remain attached to the cable, after the latter has been spirally wound on the described rotatable unit.

The rotatable unit is constructed to spirally wind a cable 40 for use in pre-stressed concrete structures and comprising a flexible tubular sheath containing several wires and terminating in anchoring heads 42 each including a plate 44 and an anchoring pin 46. To spirally wind the cable, the radial position of the slide members 7 and 12 is adjusted in relation to the length of the cable to be wound. The length of the frame 26 is similarly adjusted, the frame members thereof being locked in the selected position by means of stops or clamps. Alternatively, pairs of boxes 24 can be mounted on frames 26 which are pre-set to a length related to a specific cable length. When the boxes 22 are located on their associated slide members on one of the arms 10 and the boxes 24, interconnected by the frame 26, are located on their associated slide members 12 on the other arm 10, one of the anchoring heads 42 is located on one of the saddles 36 so that its plate 44 lies on the plate 30. Then the cable is arranged between the guides 9 of the slide members 7 and between the guides 16, the turns being distributed in a suitable manner initially in a plane extending perpendicular to the axis of the shaft 3 and subsequently in at least one further plane, and occupying only some of the seats formed by the guides 9 and 16. The radial adjustment of the slide members 7 and 12 and the arrangement of the turns can easily be determined so that the other anchoring head 42 of the cable is located on the other saddle 36. The cable is thus spirally wound with each anchoring head 42 engaged with the saddles 36. Padding, shims or other spacer means are then arranged in the spaces between the guides 16 not occupied by one or more turns of the cable, and the covers 18 of the boxes 22 and 24 are closed in preparation for the removal of the boxes, together with the wound cable, from the arms 5 and 10. After such removal the cable is retained in its wound array by means of the boxes 24 which are carried by frame 26, and by means of the boxes 22 which are supported by the turns of the cable.

In this arrangement (see FIG. 9) several such spirally wound cables can be superimposed and stacked, the boxes 22 and 24 being laid on one another, i.e., the base plates 14 of the boxes of one spirally wound cable overlying the covers 18 of the boxes of an underlying spirally wound cable. Preferably, the cables should be stacked so that the boxes 24 carrying the arms 32, 34 are angularly offset in relation to adjacent such boxes in order that the anchoring heads of the stacked cables do not interfere with one another.

The tension in the wound cables, which acts in a sense to unwind the cable, prevents movement of the boxes 22 and thus unintentional winding of the cable. On the other hand, the cable can be readily unwound on the site by successively opening the covers 18 of the boxes 22 and 24. Unwinding can additionally be effected on a rotatable unit similar to that used for winding.

The cable unwinding or pay-out is safe and positive, because the effect produced by the tension in the wound cable has the effect of releasing only the length of cable between adjacent boxes, thus avoiding accidents to the operator.

After the unwinding or pay-out, on the site, of the cables, the boxes 22 and 24 and the frame 26 can be inexpensively returned due to their restricted size, while the low cost thereof could, in certain cases, permit their non-return.

What is claimed is:

1. A device for retaining a cable in a spirally wound configuration comprising a single substantially rectangular frame extending across a diameter of the wound cable, first clamping box means mounted on each end of said frame and engaged with the cable, second clamping box means, engaged with the cable and independent of said frame and said first clamping box means, spaced angularly from each first clamping box means, each clamping box means having a respective base plate portion engaging the cable turns, respective radially spaced guides extending upwardly from said base plate portion and separating radially adjacent cable turns from each other, said radially spaced guides engaging and inhibiting expansion of the cable turns, and a respective plate cover releasably engageable with the upper ends of said guides to retain the cable turns in the associated clamping box means, each said device being operable to support an identical said device, stacked thereon, by engagement of the respective base plate portions of the clamping box means of said identical said device with the respective plate covers of the clamping box means of said first-mentioned device.

2. A device according to claim 1 wherein said cable has an anchoring head at each end and one of said first clamping box means carries
means supporting both anchoring heads.

3. A device according to claim 1, wherein said frame comprises telescoped frame members relatively adjustable to adjust the spacing between said first clamping box means, and means for locking said telescoped frame members in adjusted position.

4. A device according to claim 3, wherein each first clamping box means is mounted for adjustment on a respective one of said telescoped frame members.

5. A device according to claim 2, wherein said supporting means supports said anchoring heads oriented at right angles to each other.

6. A device for retaining a cable in a spirally wound configuration comprising a frame extending substantially across a diameter of the wound cable and having two end portions, first clamping box means mounted on each said end portion of the frame, each said first clamping box means including means defining seats for the turns of the cable, and second clamping box means independent of said first clamping box means, said clamping second box means including means defining further seats for the turns of the cable, and said second clamping means being angularly spaced from said first clamping box means, said frame forming a first rotatable arm for supporting each said first clamping box means, a second arm, rotatable coaxially with said first arm, for supporting said second clamping box means in a selected radial position, and a third arm rotatable coaxially with said first arm and carrying radially adjustable guide means for the turns of the cable.

7. Apparatus according to claim 6 wherein said frame includes
frame members, said frame members being extendable to vary the diametral distance between each said first clamping box means, and
means for locking said frame members in a selected extended position.

* * * * *